(12) United States Patent
Ledet

(10) Patent No.: US 10,560,492 B1
(45) Date of Patent: Feb. 11, 2020

(54) BROWSER APPLICATION SELECTION AND NAVIGATION OPERATIONS IN A CO-BROWSING ENVIRONMENT

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 153 days.

(21) Appl. No.: 15/181,816

(22) Filed: Jun. 14, 2016

(51) Int. Cl.
*H04L 29/06* (2006.01)
*H04L 29/08* (2006.01)
*H04L 29/12* (2006.01)
*G06F 3/0481* (2013.01)

(52) U.S. Cl.
CPC ........ *H04L 65/1069* (2013.01); *G06F 3/0481* (2013.01); *H04L 61/1511* (2013.01); *H04L 65/1083* (2013.01); *H04L 67/02* (2013.01); *H04L 67/10* (2013.01); *H04L 67/306* (2013.01)

(58) Field of Classification Search
None
See application file for complete search history.

(56) References Cited

U.S. PATENT DOCUMENTS

| 10,382,507 B1* | 8/2019 | Ledet | |
| 2004/0098462 A1* | 5/2004 | Horvitz | G05B 19/404 709/207 |
| 2012/0011451 A1* | 1/2012 | Bansal | H04N 7/15 715/753 |
| 2013/0198789 A1* | 8/2013 | Streeter | H04N 7/173 725/94 |
| 2013/0218966 A1* | 8/2013 | Jakobson | G06Q 30/0241 709/204 |
| 2014/0025744 A1* | 1/2014 | Kim | G06F 3/1454 709/204 |
| 2014/0189139 A1* | 7/2014 | Cheng | H04L 65/60 709/231 |
| 2014/0189761 A1* | 7/2014 | Sood | H04N 21/26283 725/92 |
| 2015/0134737 A1* | 5/2015 | Albrecht | H04L 12/1822 709/204 |
| 2015/0142892 A1* | 5/2015 | Bo | G06F 17/30873 709/204 |
| 2015/0324095 A1* | 11/2015 | Brown | G06F 3/0481 715/799 |
| 2016/0044071 A1* | 2/2016 | Sandholm | G06Q 10/101 709/204 |

\* cited by examiner

*Primary Examiner* — Thomas J Dailey

(57) ABSTRACT

Sharing data with various user devices may be performed by receiving a request from a first user device to connect to a session with a live web page collaboration application managed by a proxy server, loading a data presentation via a master page of a master application operated by the proxy server, receiving at least one co-browsing request from at least one other user device, authorizing the at least one co-browsing request, and providing live data from the data presentation to the first user device and the at least one other user device actively participating in the session.

15 Claims, 11 Drawing Sheets

BROWSER APPLICATION SELECTION AND NAVIGATION OPERATIONS IN A CO-BROWSING ENVIRONMENT

TECHNICAL FIELD OF THE APPLICATION

This application relates to browser access and more particularly to browser selection and re-selection type operations in a co-browsing environment.

BACKGROUND OF THE APPLICATION

Conventional user access and network based collaboration on work related projects provide access, security updates and other features to the enterprise environment. One conventional application is offered by LIVELOOK as a provider of cloud-based, real-time visual collaboration with technology for co-browsing and screen sharing that optimizes customer interactions. For example, LIVELOOK's co-browsing technology enables customer service and sales agents to collaborate and visually guide consumers through web and mobile environments to resolve issues effectively and improve quality of buying decisions.

The ORACLE 'Service Cloud' and LIVELOOK empowers modern customer service organizations to directly engage with customers, bolstering customer satisfaction, agent efficiency, and revenue growth across web and mobile channels. The 'Service Cloud' is an integral part of the 'Customer Experience Cloud', which includes commerce, sales, service, social and marketing clouds, and enables a seamless and integrated customer experience. However, such approaches to customer support and integrated collaboration tools are limited in scope and do not offer a fully customized approach to user collaboration and engagement efforts.

In one specific example, collaboration and information access operations may include various web portals and browsers. Proxy servers are utilized in today's computing world for various reasons. They may cache content, perform web-filtering functionality, make the caller (originating browser) anonymous, etc. Proxy servers may also perform the job of a "reverse proxy". The term "reverse proxy" refers to the hiding of the identity of the server with which the originating caller is interacting. A reverse proxy is a type of proxy server that retrieves resources on behalf of a client from one or more servers. A reverse proxy acts as an intermediary for it associated servers and only returns resources provided by those associated servers.

Proxy servers are mostly utilized in today's computing environment to hide the identity of the clients routing traffic through the proxy server to hide the true identity of the caller bringing anonymity to the calling client/browser.

SUMMARY OF THE APPLICATION

One example embodiment may provide a method that includes at least one of receiving a request from a first user device to connect to a live web page collaboration application managed by a proxy server, identifying a first user profile associated with the first user device and a list of corresponding functions assigned to the first user device via the first user profile, creating a session for the first user device to access the live web page on a master page hosted by the proxy server, and storing a plurality of browser status commands received from the first user device in the first user profile.

Another example embodiment may include an apparatus that includes a receiver configured to receive a request from a first user device to connect to a live web page collaboration application, and processor configured to perform at least one of identify a first user profile associated with the first user device and a list of corresponding functions assigned to the first user device via the first user profile, create a session for the first user device to access the live web page on a master page, and store a plurality of browser status commands received from the first user device in the first user profile.

Another example embodiment may include a non-transitory computer readable storage medium configured to store instructions that when executed causes a processor to perform at least one of receiving a request from a first user device to connect to a live web page collaboration application managed by a proxy server, identifying a first user profile associated with the first user device and a list of corresponding functions assigned to the first user device via the first user profile, creating a session for the first user device to access the live web page on a master page hosted by the proxy server, and storing a plurality of browser status commands received from the first user device in the first user profile.

Another example embodiment may include a method that includes at least one receiving a request from a first user device to connect to a session comprising a live web page collaboration application managed by a proxy server, loading a data presentation via a master page of a master application operated by the proxy server, receiving at least one co-browsing request from at least one other user device, authorizing the at least one co-browsing request, and providing live data from the data presentation to the first user device and the at least one other user device actively participating in the session.

Another example embodiment may include an apparatus that includes a receiver configured to receive a request from a first user device to connect to a session comprising a live web page collaboration application, and a processor configured to perform at least one of load a data presentation via a master page of a master application, receive at least one co-browsing request from at least one other user device, authorize the at least one co-browsing request, and provide live data from the data presentation to the first user device and the at least one other user device actively participating in the session.

Yet another example embodiment may include a non-transitory computer readable storage medium configured to store instructions that when executed causes a processor to perform at least one of receiving a request from a first user device to connect to a session including a live web page collaboration application managed by a proxy server, loading a data presentation via a master page of a master application operated by the proxy server, receiving at least one co-browsing request from at least one other user device, authorizing the at least one co-browsing request, and providing live data from the data presentation to the first user device and the at least one other user device actively participating in the session.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
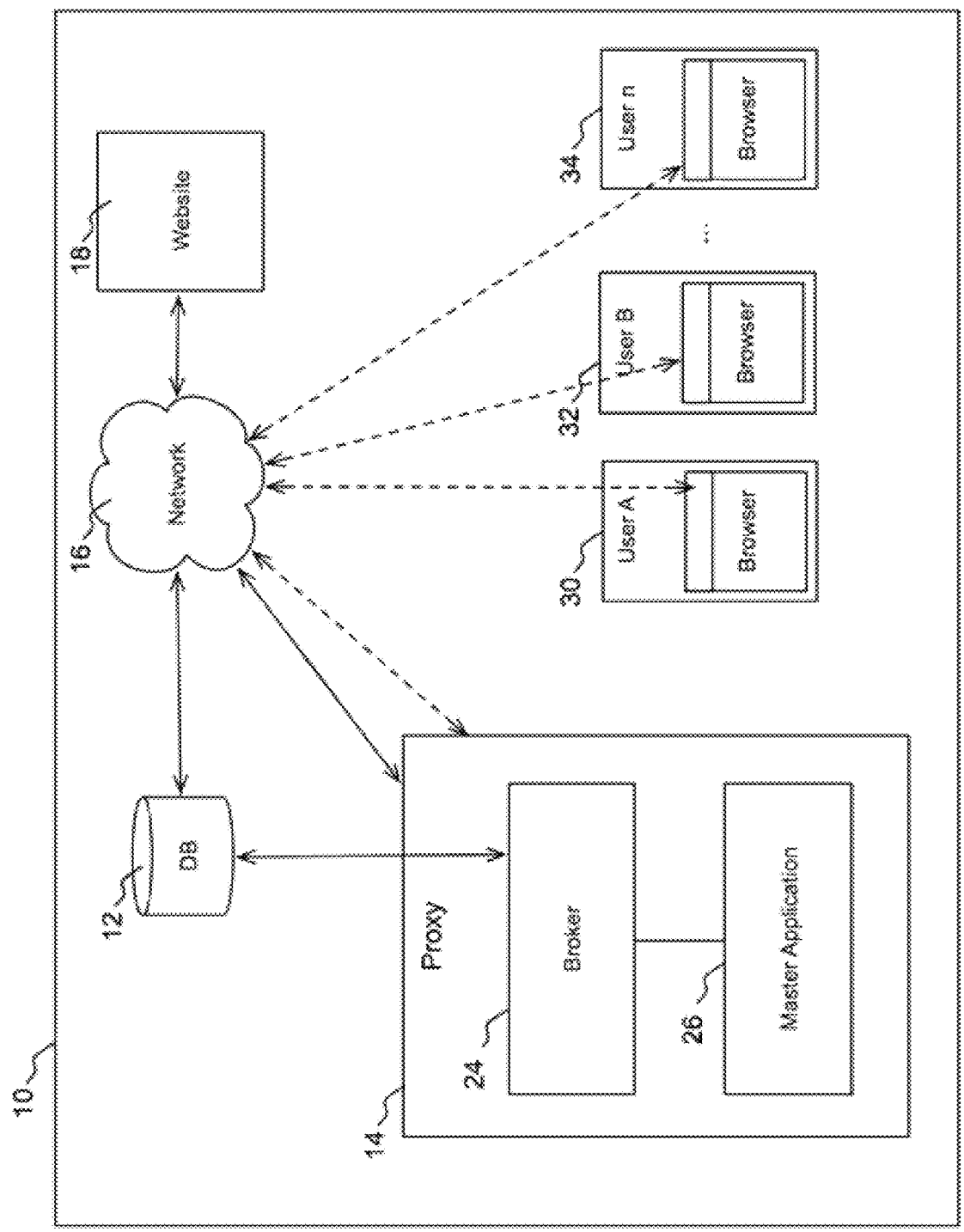
FIG. 1 illustrates a network diagram according to an example embodiment of the present application.

FIG. 1 illustrates a system network diagram according to an example embodiment of the present application. Referring to FIG. 1, the network diagram 10 of the present application may permit a "client device" or user device 30, 32 and 34 utilizing any of a mobile client machine, a tablet computer, a laptop or desktop computer to download data and application data from a remote website server 18 over the network 16. The client's device may also be a gaming device, a DVD player, or any other device that is normally used to access media.

The client device is connected to the network 16, which may be the Internet or any other type of communication network through wired or wireless communication. It should be noted that other types of devices, in addition to the device, might be used with the example embodiments of the present application. For example, a PDA device, an MP3 player device and/or any other wireless device including a gaming device, such as a hand-held device or home-based device and the like including a P.C. or other wired device that can also transmit and receive information could be used with the embodiments of the present application.

The network also introduces a proxy server 14 which is utilized to maintain a session of a user. This session stores the user's browser characteristics. The use of the proxy permits co-browsing interactions that are currently not available. In one example, the functionality of a "Snap Back" operation or reverting operation is presented where a user may join a co-browsing session then revert back to a location of the browser prior to the co-browsing. Additionally, the location of where the user reverts back to is automatically updated to include any changes that may have been made since the user left the session.

In a separate example, a user is able to input trigger keywords and other trigger data and be notified of when a presentation, for example, is at a point where the user may be interested. This occurs through the comparison of the speech (converted to text) in the presentation with keywords input by the user. A notification may also be sent upon the presentation at a certain location, for example a specific slide in the presentation.

In the example of FIG. 1, the system network 10 provides a user utilizing a browser on a device 30, 32, 34 to access a browser application, which may also be on a device, such as a gaming system, a DVD player, or any other device that is normally utilized to consume media. The user devices may also include a mobile laptop device and/or a personal desktop computer or a mobile device. It should be noted that other types of devices might be used with the present application. For example, a PDA, an MP3 player or any other wireless device, a gaming device (such as a hand held system or home based system) and the like (including a P.C. or other wired device) that may also transmit and receive information could be used with the present application.

In operation, the browsers 30, 32 and 34 interacts with a proxy server 14 through the network 16 as a data network, such as the Internet. The browser may submit HTTP commands to query remote websites 18 through the network 16 on their respective browsers. A proxy server 14 exists in the architecture, which is connected to the network. The proxy server 14 contains two elements including a broker 24 and a master application 26. The broker's main functionality is to maintain the state of the users in the system, which is maintained by a database 12 that is either directly connected to the broker (as depicted), or may be remotely located so messaging between the proxy server 14 and the database 12 is maintained through the network 10.

The broker's responsibility is to process the high-level functionality and the master application can process the lower-level functionality. In other words, the broker manages users in the environment and connections to the users and the master application manages the environment. A summary of the functionality of the broker master application includes maintaining the state of the users in the system, managing the connections to the users in the system (i.e. login), processing messages from the users and the master application, serving pages to the user, throttling connections, prioritizing connections, such as login(credentials), etc. Functions may include processRequest(request, priority), sendRequest(request, priority), getPriority( ), setPriority(userID, priority), storeTriggers(triggers), getTriggers( ). For the master application, the operations include, lower-level functionality, retaining master pages, managing the environment, storing authentication for sessions, maintaining an understanding of what all users are doing, informing the broker where the users are navigating to in the browsers, tracking user actions when they are co-browsing, joining the users' views to a master page, converting audio to text, comparing keywords to stored text, etc. Also, the functions performed by the application may include createSession (userID), storeAuthentication(userID, authentication), processRequest(request, priority), sendRequest(request, priority), sendNotification(notification, userID), convertAudioToText(audio), storeText(text, session), storeTriggers(userID, triggers), joinUser(session, userID), removeUser(session, userID), compareTextToTriggers(text, triggers).

Figure 2:
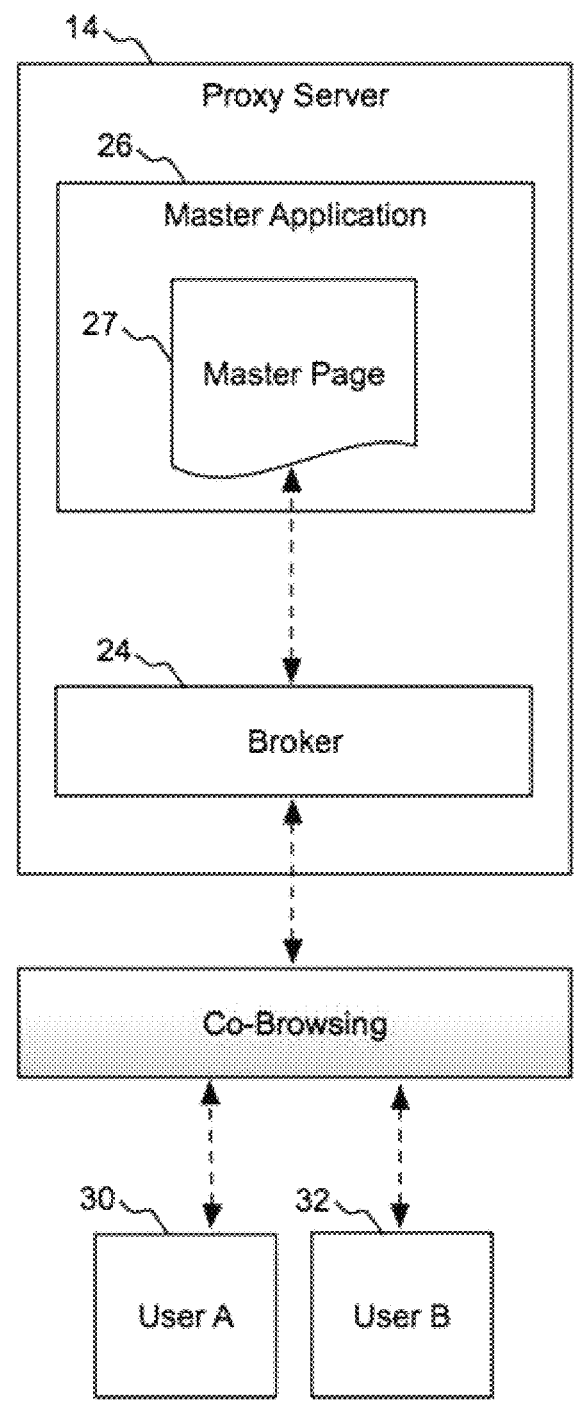
FIG. 2 illustrates a proxy server operating as a browser broker according to an example embodiment of the present application.

FIG. 2 illustrates one implementation of the current application depicting a co-browsing configuration. In this example, the proxy server 14 operates as a central point. Through the proxy server 14, connectivity with other user devices is performed. The proxy server 14 may operate as a hub to the user device browsers 30, 32 and 34 and consume Hypertext Markup Language (HTML) and respond to JavaScript requests. The proxy includes a master application 26 and a broker 24. The broker 24 is in charge of handling the connections to the users and various communication may be handled through the broker 24. The broker 24 is state-oriented and is kept abreast of the current state of each of the users. This is also the location where the cookie data elements of the user devices are actually stored. The master application instructs the broker 24 as to what the user(s) want to do and therefore sends messages to the broker 24. In a collaboration or co-browsing environment, the master application retains a master page 27. This master page contains the collaborative page that is the live version of the collaborative web page of the users in the collaboration. It is a dynamic HTML/JavaScript generator that responds to outside data input.

The proxy 24 may allow/disallow various functions and activities via a configuration that is established as the sessions are added. User devices may leave the session and revert back to the same session. User devices may have multiple master pages, similar to multiple browser windows. These master pages can communicate with each other in a manner that the browser does not normally perform. These master pages may act similar to an engine and may contain all the capabilities of any such application. The master pages can be setup as objects that generate web pages. As an object, they may adhere to object oriented coding standards and functionality, along with the feature rich functionality of 'C' or 'VB.NET'.

The implementation of the proxy server is established for a defined group of web browser connections so each web connection has its own private session. This configuration permits users to independently navigate the Internet with an independent session space so each independent session is intercepted by the Proxy server, processed, and then retransmitted to the end user browser. The proxy also provides broker individual views of a web page, synchronizing the views or allowing the views to run independently. The proxy also monitors users' views such that a request to join, or "Snap-To" or forward to another participant synchronizing the requesting user's view to the destination user's view can be performed. The view can remain synchronized, or be released for individual navigation. The proxy 14 also permits sharing of mouse related scrolling or sharing of additional functionality, such as data entry or posting commands. The proxy further permits the user's mouse and scrolling related movements to be transmitted to the proxy for each browser instance so that the proxy server has a near real-time status of each user device so they can be rendered to other browser sessions if necessary.

The proxy 14 may act as a broker, receiving activity from a user 30, gathering pertinent information, and then continuing the request on behalf of the user. The proxy then receives the response, and generates a file form the response. The proxy then serves the response back to the requesting browser. In this manner, the proxy 14 has a complete representation, including all session and cookie variable values associated with the users' browser instances. As a result, the proxy 14 can then share the browser status with other users 32 and 34. Functionality provided either by loaded code (custom browser or add-on) or through JavaScript actions may provide input to the proxy on what the user device is doing regarding input/mouse motion/scrolling. The user can invite people to join them, or join someone else's session.

Figure 3:
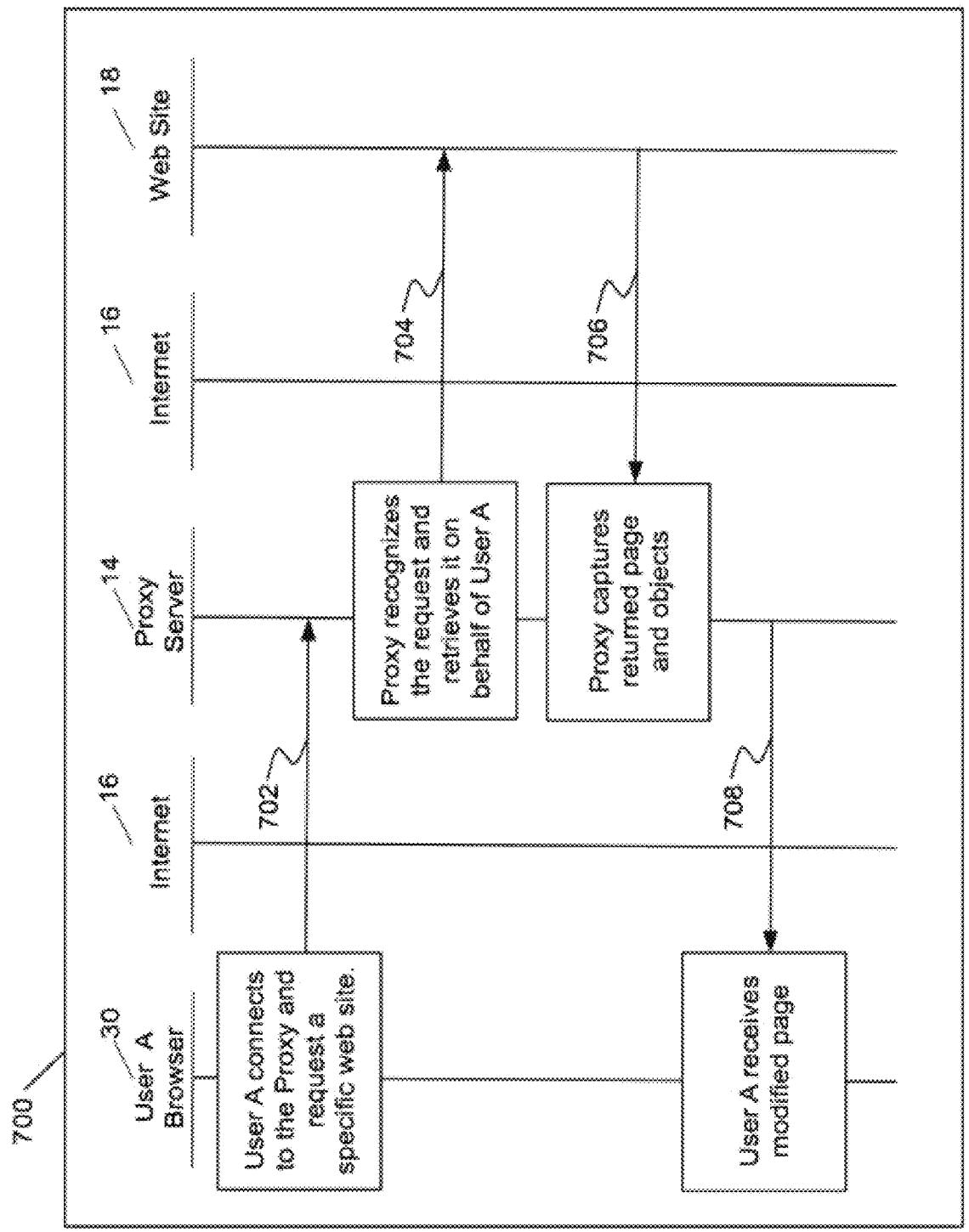
FIG. 3 illustrates system diagram of an example proxy operation during a single browser access operation according to an example embodiment of the present application.

FIG. 3 is a message flow depicting a browser requesting a webpage through the Internet 16. In operation, a user's browser 30 requests a webpage. This may occur through the user entering a universal resource locator (URL) into the address bar of the browser, selecting a URL link in the browser, etc. The user's browser sends a hypertext transfer protocol (HTTP) request to the proxy server 14. There are two types of commands in the HTTP protocol including 'GET' and 'POST'. A GET command is used to query a web page and a POST command is used to submit data to the web page, for example the data in an online user interface type form.

HTTP is a stateless protocol because each command is executed independently, without any reference or knowledge of the commands that precede that specific command. Current technologies overcome the lack of maintaining a state permitting for more intelligent interactions, such as ACTIVEX, JAVA, JAVASCRIPT, cookies, etc. Cookies represent key-value pairs that track the state of a web site in-between different page requests and are utilized to provide intelligence through multiple HTTP requests. The cookies are stored on the client originating browser, for example, and are accessed and utilized by the user's browser. The cookies can be sent to the server with every request.

In this scenario, the HTTP GET request is routed 702 to a proxy server 14 and routed through the Internet 16. The proxy server receives the HTTP GET request and "forwards" the request to the web server 704 hosting the page requested 18. If the information is not stored locally, the user's computer queries the user's ISP's recursive DNS servers. The recursive computers perform the legwork of a DNS query on the user's behalf. Recursive servers have their own caches and the information is returned to the user. In the event that the recursive servers don't have the response, then a query to the root nameservers is performed. A nameserver is a computer that answers questions about domain names, such as IP addresses. Thirteen root nameservers act as a switchboard for DNS. They can direct the query to someone that another information source.

The root nameservers will look at the first part of the use's request, reading from right to left (www.XYZ.com, for example) and direct the query to the top-level domain (TLD) nameservers for '.com'. Each TLD, such as .com, .org, and .us, have their own set of nameservers, which act like a receptionist for each TLD. These servers don't have the information needed, but they can refer directly to the servers that do have the information. The TLD nameservers review the next part of the request (www.XYZ.com) and direct the query to the nameservers responsible for this specific domain.

The recursive server retrieves the 'A' record for XYZ.com from the authoritative nameservers and stores the record in its local cache. If anyone else requests the host record for XYZ.com, the recursive servers will already have the response and will not need to perform the lookup process again. All records have a time-to-live value, which is like an expiration date. After a certain amount of time, the recursive server will need to ask for a new copy of the record to make sure the information does not become out-of-date. The recursive server returns the 'A' record back to the proxy server 14 and stores the record in its cache 706. Next, the IP address from the record is read and passed to the user's browser 708. The browser then opens a connection to the webserver and receives the website.

Figure 4:
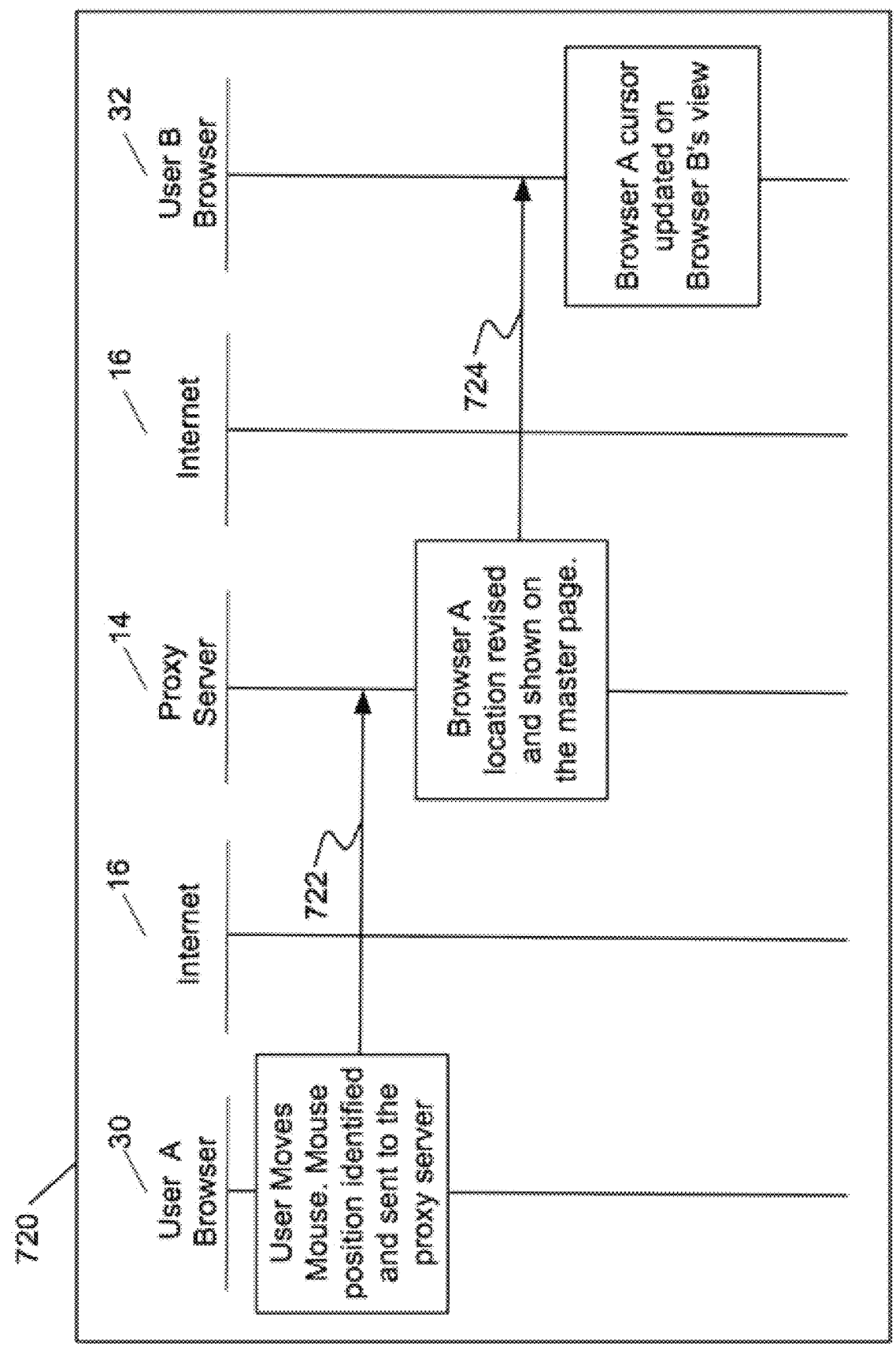
FIG. 4 illustrates system diagram of another example proxy operation during a cursor tracking operation according to an example embodiment of the present application.

FIG. 4 is a message flow of one possible implementation of the application depicting the recording and dispersion of the movement of the user's mouse. In this example, user A 30 is currently co-browsing with user B 32. As the user moves the pointing device, the mouse pointer position is identified and sent to the proxy server 722. The proxy server updates the cursor position on User A's master page 27 so user B's browser 32 is updated to display the updated cursor location 724.

A user may authorize others to co-browse through the authorization module of the current application. This authorization module is present in the software that executes on the user's device 30. Alternatively, the authorization module may be present in a remote location, such as a computer or server and access to the authorization module is performed via messaging that occurs between the remote computer/server and the user's device through the network 16. A user may pre-authorize other users to co-browse, allow any other user to co-browse, or deny all other users. Each user device in the system is referred to via a user-ID. The user-ID provides an authorization functionality where a list of user devices is referred to via their user-ID. The user-ID may represent an email address, a user-defined name, or any other normally used unique name regularly used to signify unique user devices.

Through the graphical user interface (GUI) of the authorization module, the user selects which users are authorized to co-browse with the user. These GUI elements may include but are not limited to a text component so a user may submit in one or more user-ID fields, a dropdown component such that all of the users in the system, or a sub-group of users in the system are displayed. Each user in the system relates to the corresponding user-ID listed as items in the dropdown component.

A group may also be used as a sub-section of all users in the system, for example, a group of users working within a particular project in the organization. A user working on a particular project may only be interested in co-browsing with others users in the group therefore a pre-authorization may be performed for only those users. The user also has the option to select groups. These groups are listed in the authorization module's GUI such that the user can select the group name and all of the users within that group and included in the authorization. Users may request to co-browse with any user in the system, although they are not guaranteed permission. In such a scenario, a notification is delivered to the requested user, notifying the user that another person wishes to co-browse. The user then has the option to permit or deny the co-browse request.

In this current implementation of the application, users in the system are generally one of two types including a master user and a consumer. The master user is a controller of the session and controls the master page, and has direct access to a master application. The master user also does not operate through the broker. The web page, audio, video, etc., are directly stored in the master application or a connected database. For example, a professor making a presentation online may include a master page which is established so students can join in and see the presentation. Web page, audio, video, etc. are directly stored in the master application and are related to the master page. Audio is converted to text and pattern-matching functionality is present to permit the searching of words/phrases associated with the presentation.

A consumer is not the master and is just a participant in the session. The consumer may add to a session and be removed from a session and may also access a master application through the broker. Students in the professor's class that wish to join the presentation can join the presentation and/or be notified when a preset keyword and/or webpage is matched. They may be added to and/or removed from the presentation as well.

As the presentation is ongoing, the presenter speaks and follows the presentation with the slides on the device. The text of the speech is recorded on the user's device and is sent to the proxy in real-time. The direct connection between the client device and the proxy server permits real-time updates. The audio captured at the client device, the current page of the presentation, and other elements of the presentation, such as video, images, etc., are real-time streams to the proxy and are stored by the master application either locally or remotely in a database. Additionally, functionality in the master application converts the audio of the presentation to text and stores this text with the master page data.

Figure 5:
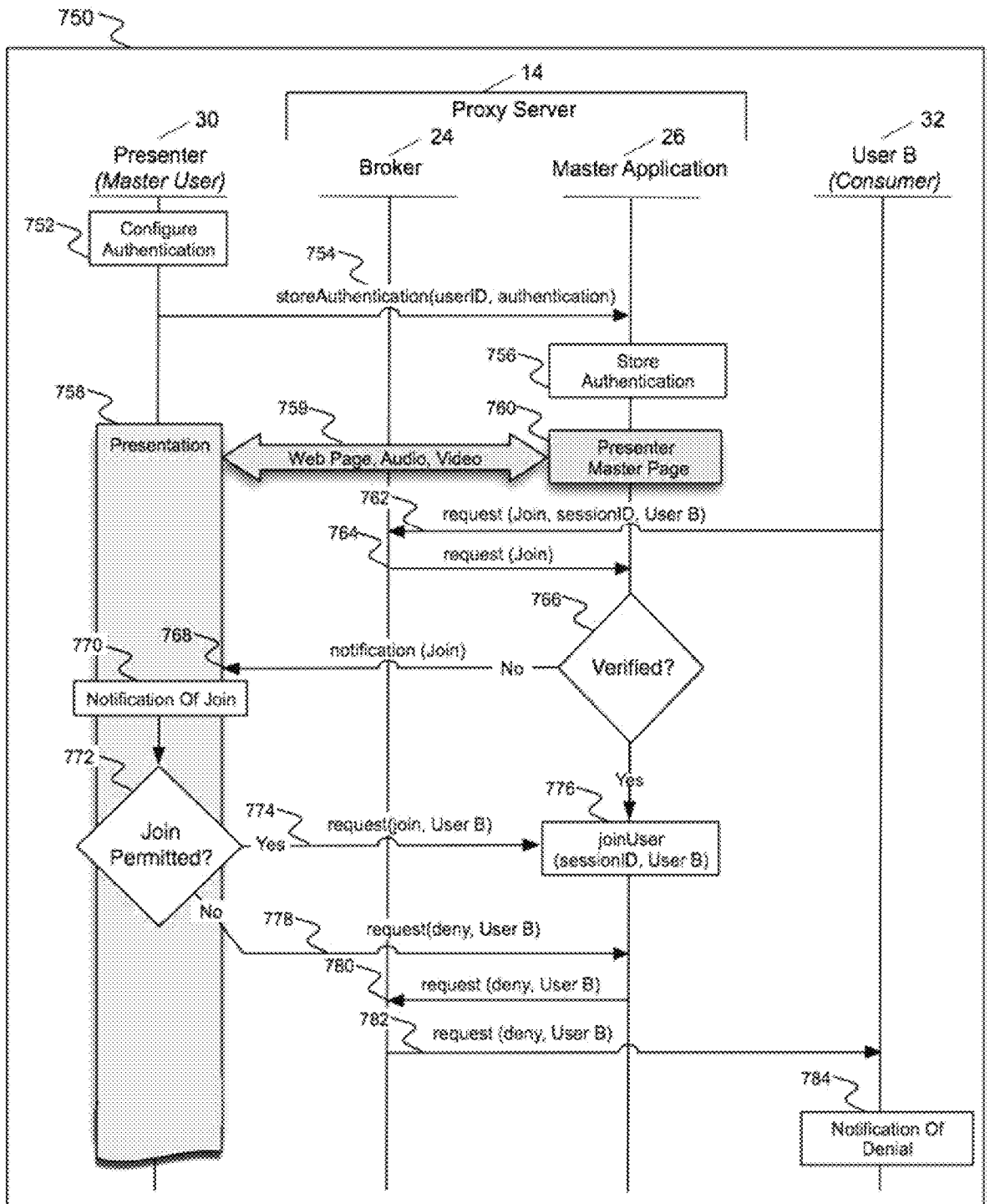
FIG. 5 illustrates a system diagram of a message flow during a proxy operation according to an example embodiment of the present application.

FIG. 5 illustrates a co-browsing session 750 which may include the elements of the proxy server 14 and the functionality of each element in the proxy server 14. In this example, a presenter device 30 may be actively providing a web-based presentation. This presenter 30 permits other user devices to join in the presentation by co-browsing so the browser being controlled by the presenter 30 is viewable in real-time by the others, in this example, user B 32.

User B 32 can join into the presentation if user B is authorized to do so, and as a result, the presenter 30 provides authorization through the authorization module of the proxy server 14, and user B 32 is authorized to join the presentation. The master application stores the authorization credentials and provides the logic to verify the requests and only authorize those users to co-browse together with the presenter and other authorized user devices once their user-ID is authorized.

FIG. 5 is a message flow in one possible implementation of the application depicting the user B 32 joining a presenter 30 in a co-browsing session. In this example, the presenter 30 is a user of the application that is considered a "Master User". This user is not a typical user, but one that controls the master page, which is stored in the master application 26. Accordingly, that presenter/master user profile has direct access to the master application and does not need to go through the broker 24 for access to the master application. Data is delivered, streamed, updated, etc., directly to the master application and the master application has functionality (i.e. methods and procedures) that process the incoming data from that user device. The message flow therefore depicts the presenter device 30 overstepping the broker 24 during the authentication procedure 754. Other users (User B 32 in this example) are considered "consumers" of the presentation and messages from those consumers are processed via the broker 24.

The presenter 30 begins the process by using the authorization module to configure users that are authorized to co-browse 752. The presenter 30 provides user B's user-ID as a preauthorized user through the GUI. A store authorization message 754 is sent to the proxy server 14. The master application 26 stores the authorization data received in the store authentication message 756. The data may be stored in a local or remote database 12. If the database is local, a store message is sent to the broker 24 and forwarded to the database. If remote, a store message is sent to the broker 24 and forwarded to the database through the network 16.

The presenter 30 may initiate a browsing session 758, such as a presentation. The nature of the presenter 30 being a master user permits the master page 760 to automatically contain the live data of the presenter 30, including the browser data (i.e., web page), audio of the presentation, video of the presentation 759, etc. This master page is stored in the proxy server 14 that is utilized by other users co-browsing. It contains the most recent browsing activities of all users in the co-browsing session. Currently, the master page contains only the browsing of the presenter 30, as no user devices are currently co-browsing at this time in the procedure. The updating of the presenter's browsing is continually updated with the master page 760 so the audio of any voice recorded at the presenter's device is stored in the master application, video of the presenter, etc. The audio is synched with the current page of the presentation in the master application. Speech-to-text functionality commonly understood is used to convert the presenter's speech-to-text and stored.

User B 32, through the current application's GUI requests to co-browse with the presentation. This is performed via user B clicking on a GUI element such as "Co-Browse" button in the application executing on User's B device 32. Alternatively, a menu item in the GUI may also permit the user to navigate to the co-browsing functionality. The software then permits the user to select the user(s) with which to co-browse through a GUI element such as a list of all users, or a group of users in the system. The user may select the item associated with presenter. The software application sends a request (Join) message 762 with the user-IDs of the originator device and user profile of the message (User B 32) and the requested user (Presenter 30) to the proxy server 14. The broker 24 receives the request message and generates and sends a request (Join) message 764 containing similar data received in the request (Join) message 762 to the master application, which compares the user-IDs received in the verification message to the stored authorization data 756. If the master application determines that user B 32 is authorized to co-browse with the presenter 766, user B 32 is joined to the presenter's session 776. At that point, current co-browsing functionality is performed such that everything that each user can observe the other users in the browser via a notification. This may include the displaying of multiple cursors, navigation of components on the web page, audio and/or the text of the audio, video, etc.

In the event that the user is not verified 766 by the master application, then a notification (Join) message 768 is sent to the presenter. The presenter's application on the device 30 receives the join message 768 and a notification is presented to the presenter 770. The notification's data contains the user information of user B 32. The notification window is displayed on the presenter's device 30 and additional GUI components permit the presenter 30 to join via an "Accept" button or disallow the join (via a "Deny" button).

If the presenter verifies the join decision 772, a request message 774 is sent to the master application with the join and user B parameters, and the master application combines the view and data 776 of the presenter with that of user B 32. If the presenter 30 does not permit user B 32 to join, then a request deny message 778 is sent to the master application with data indicating that the deny is regarding user B 32. This message is forwarded to the broker 780, and finally forwarded to user B 782. The message is received at user B's device and the application notifies user B of the denial of the request 784.

The co-browsing session environment permits a user that is currently co-browsing to "Snap Back" to their original browsing environment that was present before the co-browsing took place. The snap back or reverting operation functionality begins in the master application when the join is made between two user devices. The users' browser environments (i.e., current page being viewed) are referred to as a "prior page" and the page that the user is viewing once co-browsing is referred to as the "co-browsing page". In the event that a user is co-browsing, then decides to leave that session and join another co-browsing session then revert to the previous session, the previous page may have been updated by the previous co-browsing session and therefore must be the current page. For this reason, the master application is the element that manages the reversion logic.

The procedure of snapping-back or reverting is to permit the user to enter into a co-browsing environment and be able to return back to a live version of a previous environment. For example, if the user is in a co-browsing environment and joins another co-browsing session, and then returns back, the live state of the original environment is presented to the user, and this is the state of the environment that may have been updated since the user left the session. This is accomplished by the use of a "Master Application" and the use of a "Master Page" containing the live version including all live updates from all users co-browsing in the environment.

Although browsers are used in the various examples, the functionality may be interworked into other applications, for example a desktop application, a mobile application, etc. The use of a browser is merely an example environment, however, the functionality presented should not be limited to only a browser environment.

Figure 6:
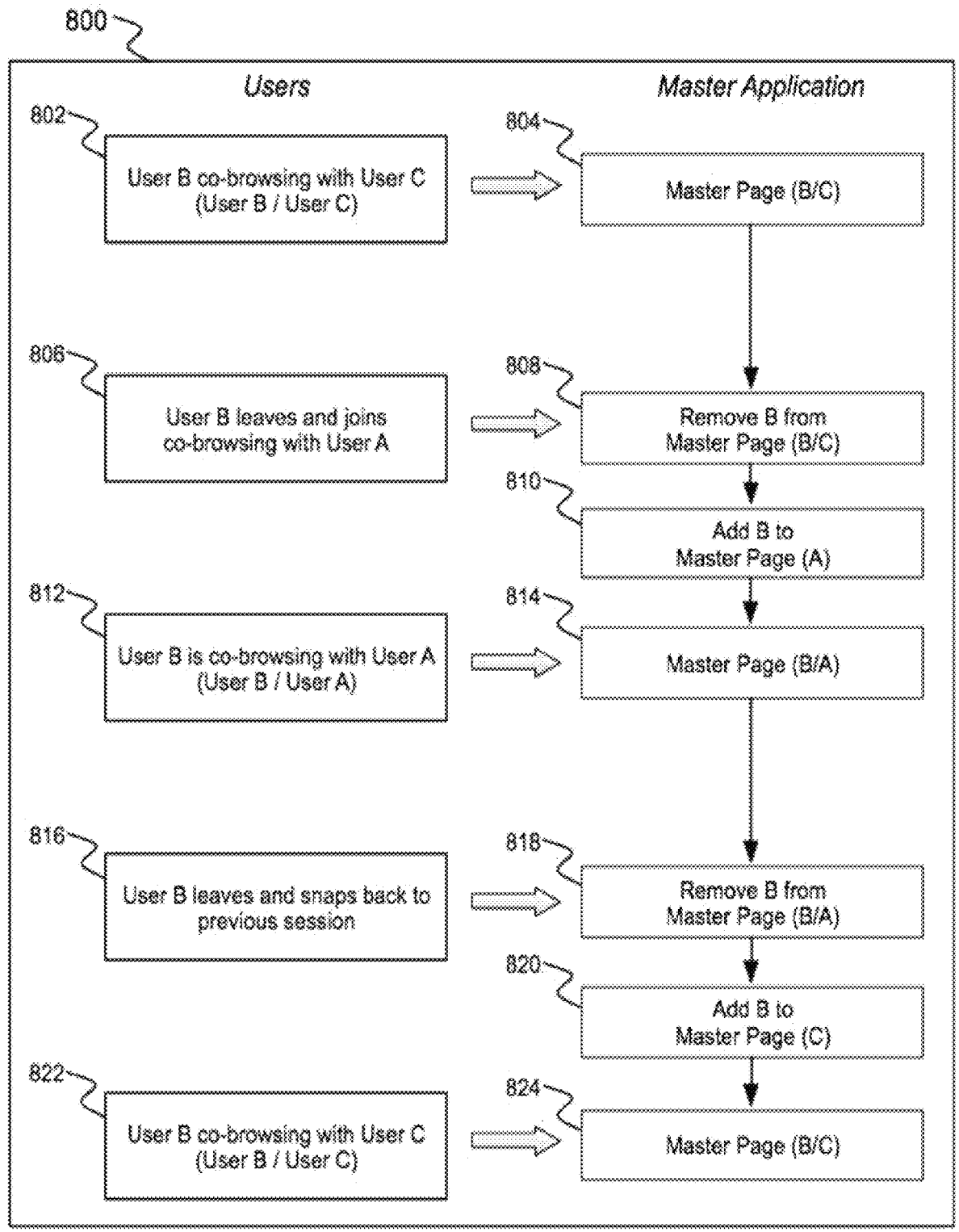
FIG. 6 illustrates a browser reverting operation according to an example embodiment of the present application.

FIG. 6 illustrates one possible implementation of the current application depicting the reverting operation functionality 800. Referring to FIG. 6, user B is currently co-browsing with user C 802 in an active co-browsing session. As a result, the master page in the master application is currently joined with users B and C 804. This indicates that both users B and C share the same view of the master page (B/C). If user B decides to leave the co-browsing session and join another co-browsing session with user A 806. This action causes user B to be removed from the master page (B/C) 808 and join with master page (A) 810. User B is therefore considered to be co-browsing 812 with user A, as indicated by the master application containing the master page (B/A) so users B and A share the same view 814.

In the event that user B decides to leave the joined session with user A and revert back to the previous session 816. This causes user B to be removed from the master page (B/A) 818 and joined with the master page (C) 820. It is important to note that master page (C) may have updated during the time that user B was removed from the session and therefore the current, updated page is rejoined. As a result, the page may be in a different state then when user B left the master page, however it is the current view of the master page (C). Finally, user B is once again co-browsing with user C 822 as noted by the master page (B/C) 824. As the master application controls the management of the connections of the users, it is necessary to discuss the functional elements in the master application that permit the adding and removing of users from the master page.

Figure 7:
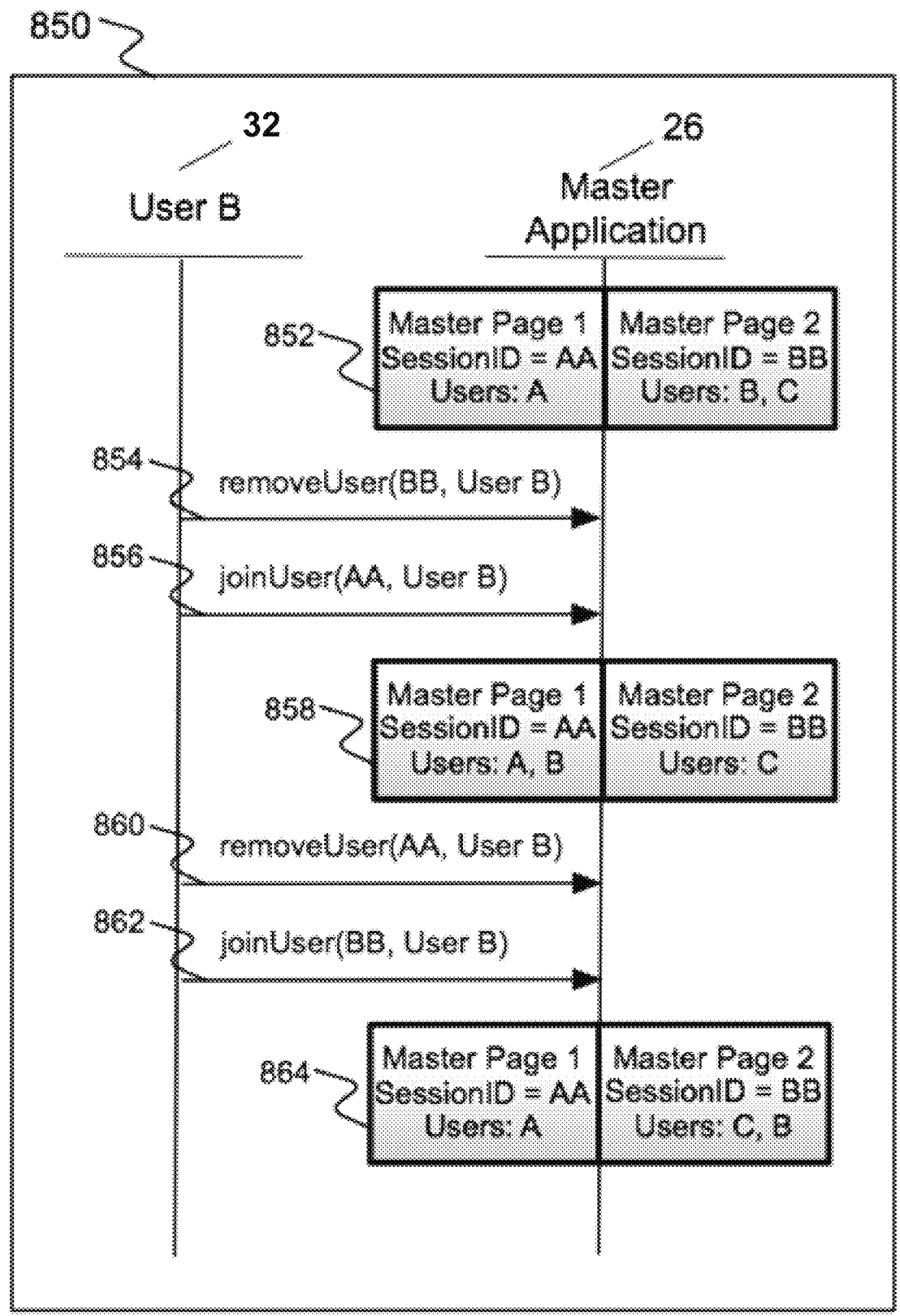
FIG. 7 illustrates a messaging flow during a browser reverting operation according to an example embodiment of the present application.

FIG. 7 illustrates a message flow of one possible implementation of the current application depicting the revert functionality 850. The example in FIG. 7 depicts the current state of the master pages in the master application 26 as a user is removed and joined to different sessions. The state of the sessions are included in the first state data 852 which demonstrates that there are two master pages (1 and 2) and that user A is the only user in the master page 1, and that user B 32 and user C are currently co-browsing via master page 2. Continuing with this example, user B 24, through interactions with the GUI, performs interactions, such as presses a "Remove" button, so that user is removed from the co-browsing session 854. This action creates an event that is intercepted by a function that issues a 'removeUser' message 854. The parameters of the message indicate that the sessionID "BB" refers to master page 2, and the user "User B" is the user to be removed. The master application receives the message and a function is called that removes user B from session "BB" of master page 2.

User B also performs interactions in the GUI, such as selects a "Join" button so that user is able to either type user A's userID in a text component or select user A from a list of users in a dropdown component. This action initiates an event that is caught by a function that issues a 'joinUser' message 856. The parameters of the message indicate that user A is the user with which that user wishes to co-browse with, and that user B is the user to be added to the session. The master application receives the message and a function is called that adds user B to "Master Page 1". The updated state of the sessions is illustrated in the second state status 858. This example demonstrates that there are two master pages (1 and 2) and that user A and user B are currently co-browsing via master page 1, and that user C is the only user in the master page 2.

User B 32, through interactions with the GUI, performs interactions, such as presses a "Remove" button, so that the user is removed from the co-browsing session. This action creates an event that is intercepted by a function that issues a 'removeUser' message 860. The parameters of the message indicate that the sessionID "AA" refers to master page 1, and the user "User B" is the user to be removed. The master application receives the message and a function is called that removes user B from session "AA" or master page 1.

User B 32 also performs interactions in the GUI, such as selecting a "Join" button so that user is able to either type user C's user-ID in a text component or selected user A from a list of users in a dropdown component. This action creates an event that is intercepted by a function that issues a 'joinUser' message 862. The parameters of the message indicate that user C is the user with which that user wishes to co-browse with, and that "User B" is the user to be added to the session. The master application receives the message and a function is called that adds user B to "Master Page 2".

The final state of the sessions is illustrated in the third and final state 864. This example demonstrates that there are two master pages (1 and 2) and that user A is the only user in the master page 1 and that user B and user C are currently co-browsing via master page 2. While user B was disconnected from master page 2, user C could have continued to update the web page and/or navigate to another location, or initiate a co-browse session with one or more other user devices. Upon user B's reconnect 862, the current and live version of the master page 2 is obtained and viewed by user B.

The forwarding functionality permits a user to predetermine conditions of interest in a presentation, and then be alerted by the application when those conditions are satisfied. This permits the user to continue productivity while being alerted to the presentation when a predetermined topic of interest arises. The master application handles the receiving of the user's triggers and stores the triggers. As the presentation occurs, the current page and any audio from the speaker are analyzed by the master application so pattern-matching occurs with the stored triggers. When a match is made, the user is either notified or automatically placed into a co-browsing session with the presentation. The presenter 24 provides authentication (not depicted) so the user attendee 32 is included to be preauthorized to join in the presentation.

The user first selects the presenter's user ID or otherwise any element related to the presenter, for example, an email, name, etc., in a GUI window displayed on the client device 32, referred to as the co-browsing selection window. A process is then initiated that determines authorization, as is described in operations 754 and 762. In addition to selecting a user to co-browse with in an active session, the GUI window permits for users to be notified when particular interests arise in any co-browsing or presentation session. When selected, another GUI window appears permitting the user to enter criterion of when they would desire to be notified.

Figure 8:
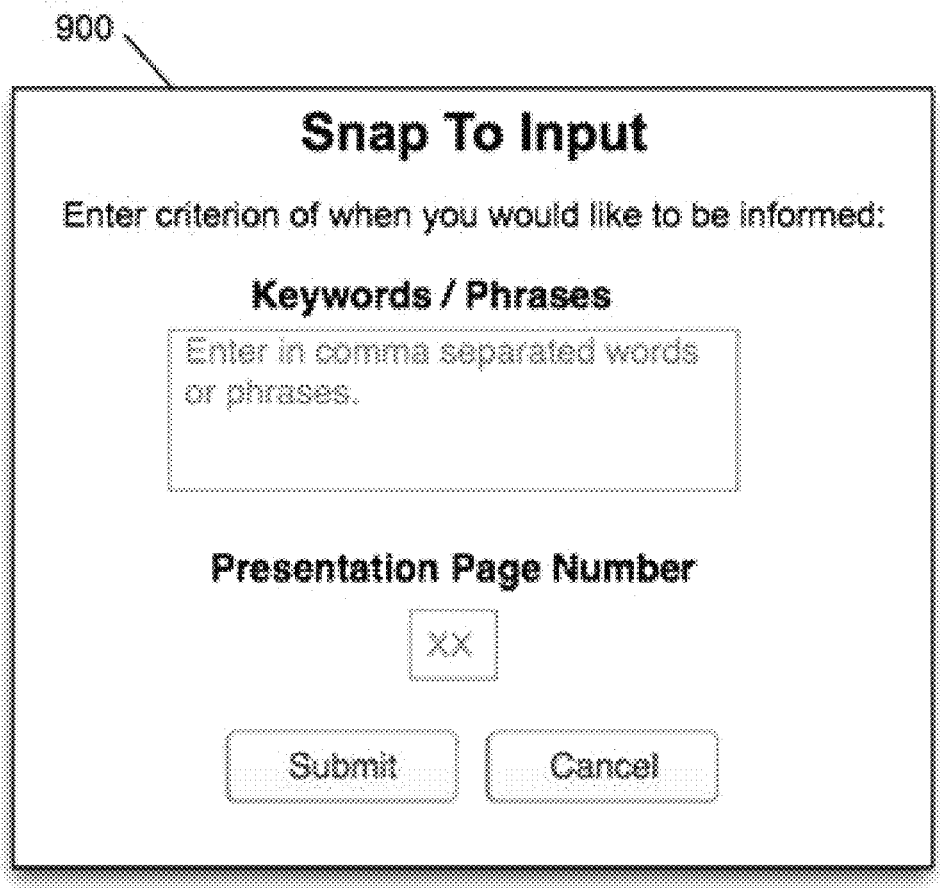
FIG. 8 illustrates user application interface used for a browser content forwarding and reverting procedure according to an example embodiment of the present application.

FIG. 8 illustrates one implementation of the current application demonstrating a GUI representation of the user submitting "snap to" or forwarding subject data and related criterion. The user begins by providing trigger data so there are at least two elements entered including keywords/phrases of interest and/or page numbers of the presentation. In the event that the user is aware of the presentation and is able to determine the presentation page number of interest, then the page number can be entered as well. If the user is more interested in concepts, regardless of where the presentation is located, the user can enter words and/or phrases. Upon pressing the "Submit" button, this data is sent from the client device 12 to the proxy server 14 and stored in the master application so the data that the user entered into the interface 900 is stored along with that user-ID and the session-ID of the co-browsing presentation session. This data is stored locally in the client device 12 or may be stored in a remote location such as an entity in the network 16 (Cloud), or in a database 12 accessed via the network. In another example, additional data is included in the GUI window, including the user-ID of the presenter, the title of the presentation, etc., which is made available in the co-browsing selection window.

Figure 9:
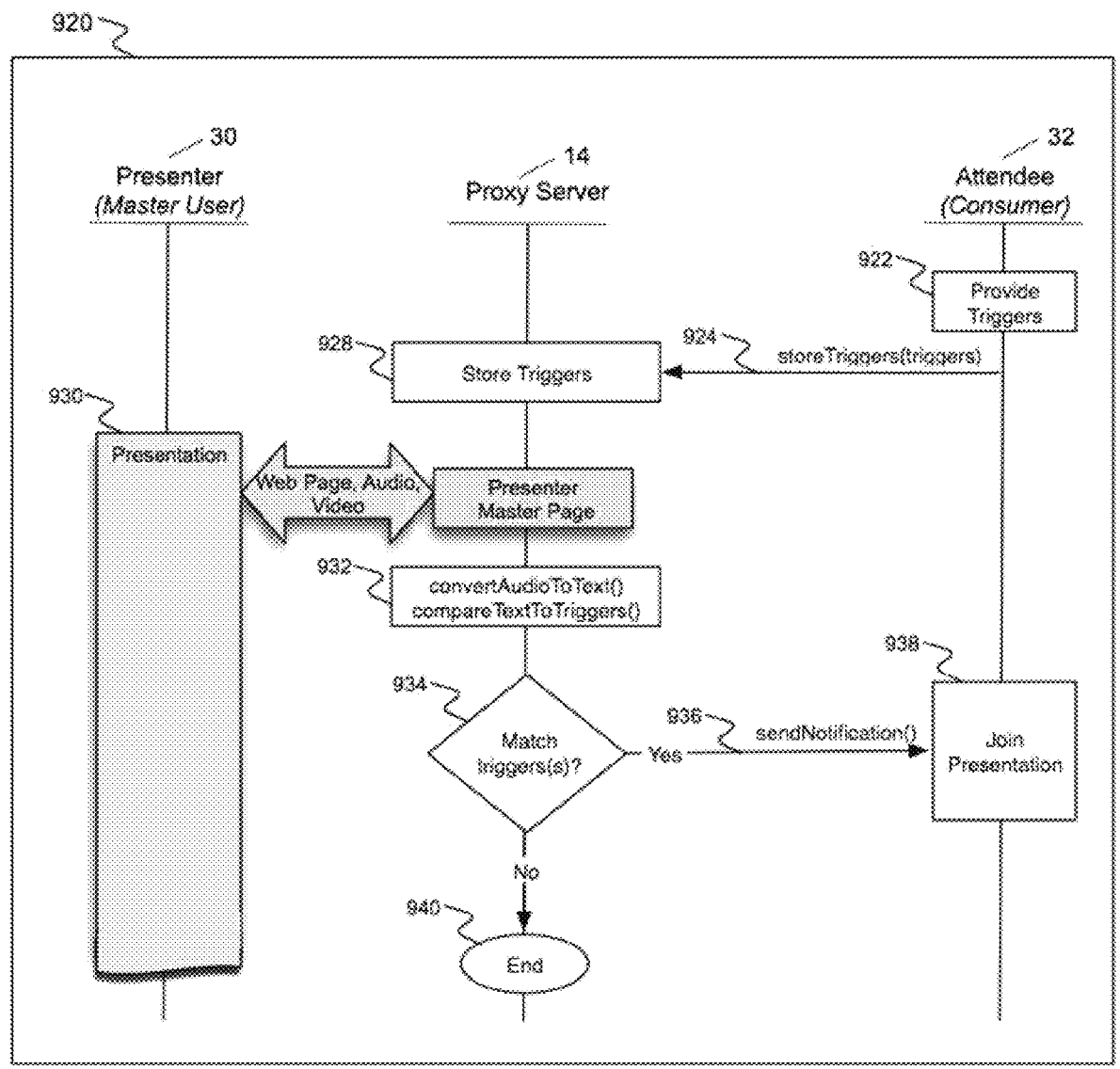
FIG. 9 illustrates a message flow of a browser content forwarding operation according to an example embodiment of the present application.

FIG. 9 is a message flow in one possible implementation of the application depicting an attendee joining a presenter in a 'snap-to'/automated-forwarding scenario. Referring to FIG. 9, the process 920 includes the user first providing the trigger data 922 that is used to join the presentation. The client device 32 transmits the trigger data in a 'storeTriggers' message 924 sent to the proxy server 14. The master application in the proxy receives the message and stores the triggers 928. This message is received by the broker 24 of the proxy which is then forwarded to the master application.

The presenter device 30 then initiates the presentation 930. The presenter is a master user and the master page residing in the master application of the proxy is automatically updated to contain the live data from the master user. Accordingly, all web navigation, audio captured by the presenter's device 30, video recorded at the presenter's device, etc., is uploaded, streamed, or otherwise automatically updated at the master application. Additionally, the audio from the presentation is converted to text via the function convertAudioToText( ) 932 in the master application and the text is stored with the presentation in a local database or a remotely located database so messaging will take place between the remotely stored database and the proxy via the network 16. As the presentation occurs, the text (having been converted from the presenter's audio) is compared against the stored triggers 928 via a function call 'compareTextToTriggers( )' 932.

A check is made to determine if a trigger has matched with the stored triggers 934. If there is a match, then the attendee is notified via a 'sendNotification' message 936. The client device presents a notification window (not depicted) signifying the presentation is at a point where an interest reflecting the previously entered triggers can be identified. A button on the notification window has a "Join" option that, when selected performs current co-browsing functionality and the attendee is then viewing the same master page as the presenter, stored in the master application. If there is no match to the triggers 934, the process ends 940.

In another example of the current application, the position and interactions of the window that the user is presented with is disclosed. The user enters in trigger data 922 and the trigger data is stored in the master application 26 of the proxy 14. When the triggers are matched using pattern-matching 934, a notification is sent to the user to inform the user that triggers were matched and the presentation is at a point where there is likely interest. In this example, upon the matching of the user's triggers automatically initiates the co-browsing session for the user. Thus, the user may or may not receive a notification regarding the matching of the trigger.

The co-browsing window may be displayed on the user's screen at a specific dimension and location. For example, when a trigger is matched, the window appears at the top/right of the user's display, and is ¼ the size of the user's display size. The user may through regular operating system functionality move the co-browsing window to other parts of the display. The user may also through regular operating system functionality resize the co-browsing window.

In another example, the location and the size of the co-browsing window are presented based on the trigger that was met. This is accomplished by setting a priority of a trigger when entering the trigger data 922. As such, the user is able to provide a priority (1, 2, 3, etc.) to each trigger where a lower number is related to a higher priority. GUI components are added to the window where the user enters the data for the triggers. Another column is present on the window entitled "Priority". For each trigger entered, there is a text entry component or a dropdown component existing where the user may enter or select a priority number. For priority '1' triggers, the entire user's display is automatically used to display the co-browsing window. For priority '2' triggers, ⅓ of the user's display is automatically used to display the co-browsing window. For priority '3' triggers, ¼ of the user's display is automatically used to display the co-browsing window.

As an example of a reverting operation, the user interacting with the "Snap To Input" GUI screen 900 provides input 922 in the keywords/phrases textbox containing the following: "Phase 3 of development", "CAN messaging". Therefore, the user desires to be notified when the presenter mentions either of the input phrases. This data is sent from the attendee's device 32 via the 'storeTriggers' function 924. The proxy server 14 receives the message and stores the triggers. As the presentation is made, the audio of the presentation in the proxy server is converted to text and stored 932. The function 'compareTextToTriggers' compares the text to the stored keywords/phrases previously stored. During the presentation, the speaker says one of the keywords, "phrase 3 development" and the text of the presentation is compared to the stored keywords/phrases. A match is made and therefore a notification is sent to the attendee's device 32. This notification includes the keyword/phrase that was matched and permits the user to join the presentation via the GUI, for example, a button entitled "Join". The user then becomes a consumer of the presentation.

The master page is one page which is dynamically updated to be a current "live" page with respect to where the presenter is at the current time. There are no custom features on the master page. The master page is controlled via the presenter, or master user and each of the users, or consumers, may view the master page as permitted via the software. In one example, users (consumers) are joined and/or removed to/from viewing the master page. In the example implementation, the master page would contain the cursor movements of a master user, or the presenter. The users (consumers) mouse would not be visible on the master page. The presenter's interactions are updated to the master page and the master page contains the current live version of the presentation, such as a webpage/video/audio, etc. In one example, the presenter may temporarily permit "control" over to a consumer such that the consumer's interactions would be reflected on the master page for a period of time, for example. For example, a professor may be engaged in a presentation, and a POWERPOINT slideshow, for example, and the display of the slideshow and corresponding audio is present. The master page contains two elements including the slideshow presentation, the current POWERPOINT slide in the presentation, and corresponding data of the speech of the presentation which may or may not be synchronized with the current slide of the slideshow. The speech may then be converted to text and stored in the proxy server 14.

In another example, a remote student using a computer device may request to join the presentation and a request message 762 is sent to the broker 24, and if the presenter accepts the join, the student is "joined" to the presentation via a request message 774. On the student's display, the contents of the master page are then viewed. This is the live view of the presentation, as reflected by the joining of the student to the master page in the master application 26. The audio of the presenter is also received at the student's computer device.

The student may set a trigger as the student does not wish to be present during the entire presentation, but only notified when the trigger is made. The student enters the trigger information 900, and the student may leave the presentation or continue to be joined to the presentation. When the trigger is reached, a notification is sent to the student 936 and the user may retrieve the presentation if not previously removed from the presentation, or rejoin the presentation if previously removed. The user is then served the current live view of the presentation as reflected in the joining of the master page.

Figure 10:
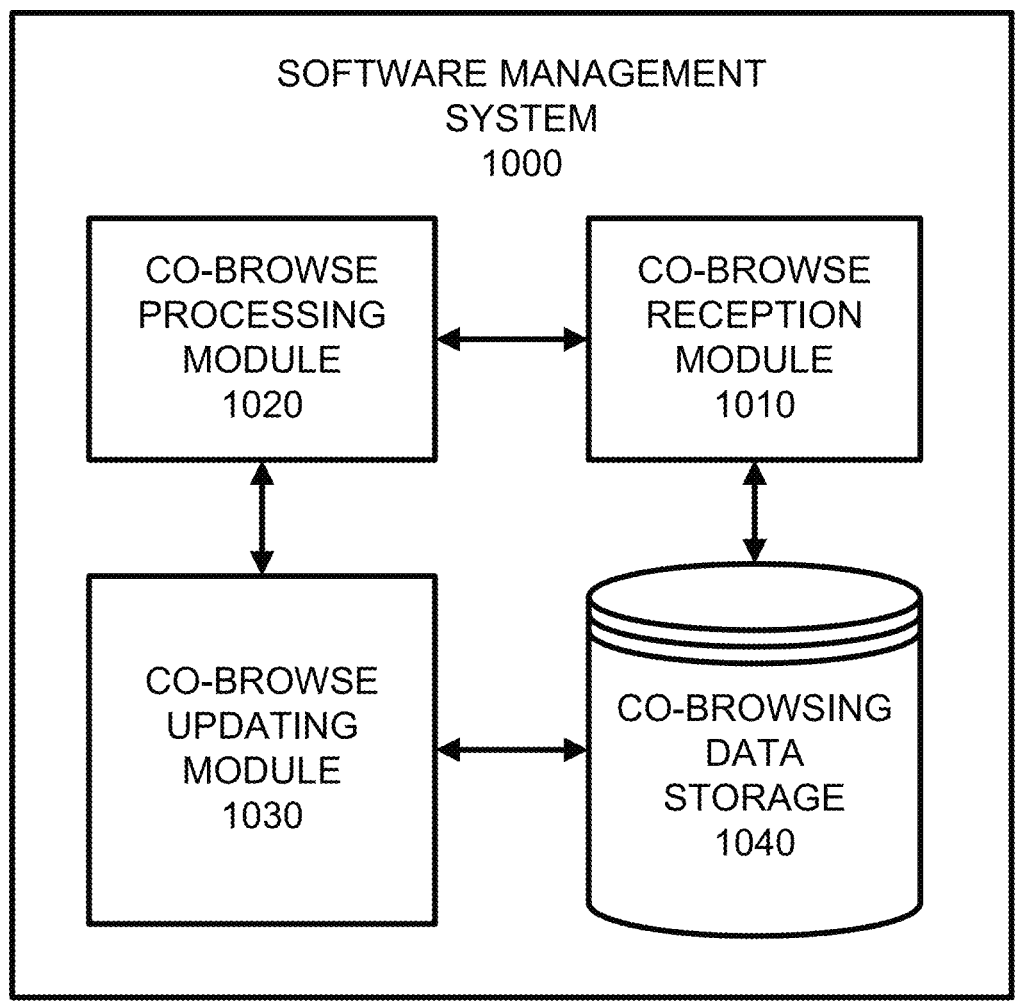
FIG. 10 illustrates a system configuration configured to perform one or more of the example embodiments of the present application.

FIG. 10 illustrates a software management system 1000 according to example embodiments. Referring to FIG. 10, the system 1000 may represent a standalone computer, a group of computers on a network, in the cloud or in communication via any medium known to one skilled in the art which operate to perform the various operations, procedures, methods and related functions of the present application and the software application described throughout the disclosure. Referring to FIG. 10, the comment reception module 1010 may be a transmitter/receiver that receives comments to code and stores the comments in memory 1040 and forwards the comments for processing 1020. The updated content may be identified and stored in memory via the comment update module 1030.

The system 1000 may be configured to perform an example method that includes receiving a request from a first user device via the comment reception module 1010 to connect to a live web page collaboration application managed by a proxy server. The processing module 1020 may perform identifying a first user profile associated with the first user device and a list of corresponding functions assigned to the first user device via the first user profile, and creating a session for the first user device to access the live web page on a master page hosted by the proxy server. The plurality of browser status commands are then stored in the memory 1040 via the update module 1030, as received from the first user device in the first user profile.

Additionally, the system 1000 may perform storing session variables and cookie variables associated with a browser of the first user device in the first user profile as a first browser status, and sharing the first browser status with a plurality of other user devices participating in the session. Additionally, the system 100 may perform monitoring actions performed by the first user device during the session, recording the actions and forwarding the actions to the proxy server, and updating the master page to include the actions performed by the first user device via the processing module 1020. The actions may include at least one of mouse movements, web page requests, and item selections from the web page. The operations may also include accessing and loading a data presentation via the master page, and authorizing access to the presentation to at least one of the other user devices via a broker module. Additional operations may include identifying at least one content instance in the data presentation, and notifying the at least one other user device when the at least one content instance is identified. Also, the system may further perform updating the master page to include at least one of audio, video and images from the data presentation responsive to identifying the at least one content instance in the data presentation.

Another example method of operation may include the system 1000 receiving a request from a first user device to connect to a session including a live web page collaboration application managed by a proxy server, loading a data presentation via a master page of a master application operated by the proxy server, receiving at least one co-browsing request from at least one other user device, authorizing the at least one co-browsing request, and providing live data from the data presentation to the first user device and the at least one other user device actively participating in the session.

The method may also include updating the master page to include at least one of audio, video and images from the data presentation and identifying at least one content instance in the data presentation matching one of a plurality of content triggers associated with at least one user device registered with the proxy server, and notifying the at least one registered user device of the identified at least one content instance via a notification. The notification may include a request to join the session. Another operation may include identifying a plurality of content triggers associated with at least one user device, and identifying a priority associated with each of the content triggers. The notification is created based on the priority assigned to the content trigger matching the at least one content instance. The method also provides automatically loading and adjusting a size of a window on a display of the at least one user device responsive to the notification being received by the at least one user device, the window includes the content instance and the size of the window being based on the priority assigned to the content trigger.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 11 illustrates an example network element 1100, which may represent any of the above-described network components, etc.

Figure 11:
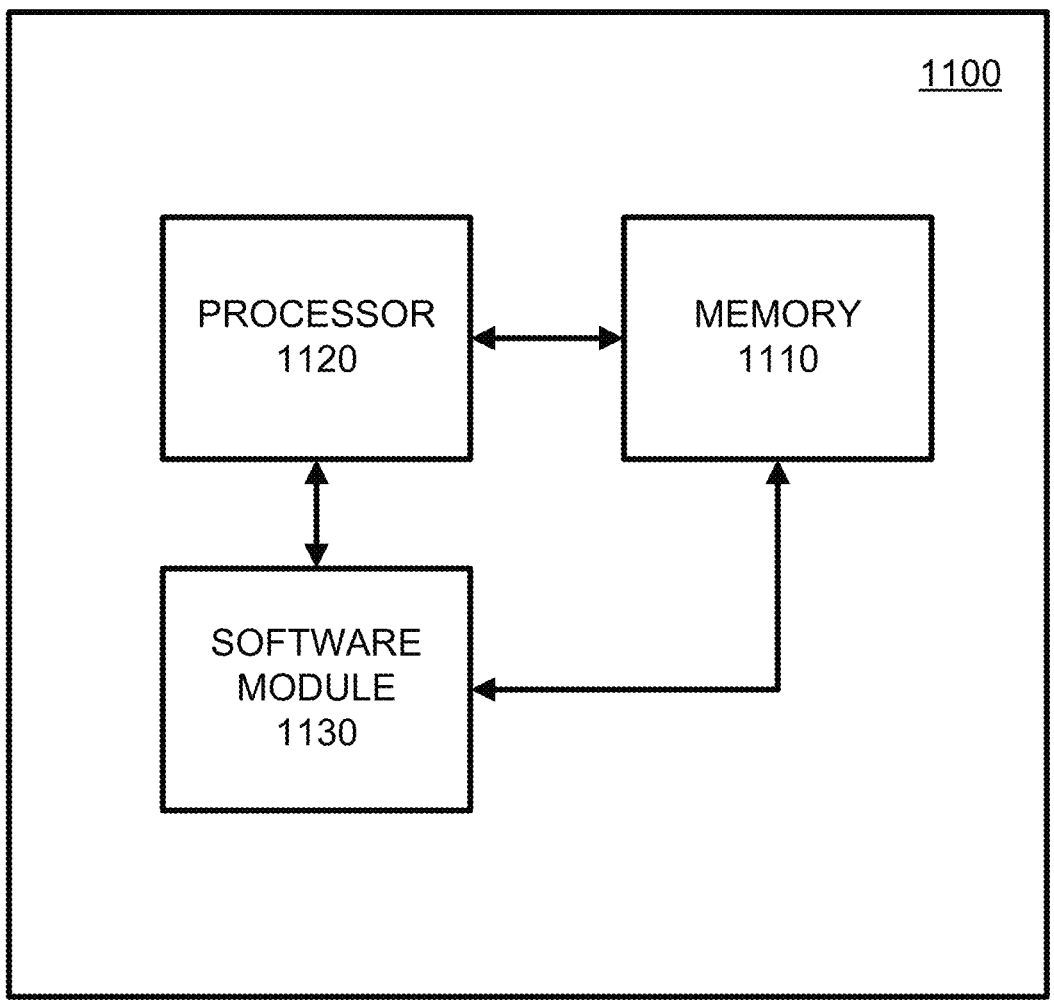
FIG. 11 illustrates an example network entity device configured to store instructions, software, and corresponding hardware for executing the same, according to example embodiments of the present application.

As illustrated in FIG. 11, a memory 1110 and a processor 1120 may be discrete components of the network entity 1100 that are used to execute an application or set of operations. The application may be coded in software in a computer language understood by the processor 1120, and stored in a computer readable medium, such as, the memory 1110. The computer readable medium may be a non-transitory computer readable medium that includes tangible hardware components in addition to software stored in memory. Furthermore, a software module 1130 may be another discrete entity that is part of the network entity 1100, and which contains software instructions that may be executed by the processor 1120. In addition to the above noted components of the network entity 1100, the network entity 1100 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 10 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving a request from a first user device to connect to a session comprising a live web page collaboration application managed by a proxy server;
   identifying a first user profile associated with the first user device and a list of corresponding functions assigned to the first user device via the first user profile;
   loading a data presentation via a master page of a master application operated by the proxy server;
   receiving at least one co-browsing request from at least one other user device;
   authorizing the at least one co-browsing request;
   providing live data from the data presentation to the first user device and the at least one other user device actively participating in the session, wherein the first user device is able to revert back to a live version of a previous session, wherein each user device can have multiple master pages, each master page capable of communicating with each other;
   identifying a plurality of content triggers associated with at least one user device, wherein upon the matching of the triggers the co-browsing session for the at least one user device is automatically created; and
   identifying a priority associated with each of the content triggers, wherein a notification is created based on the priority assigned to the content trigger matching the at least one content instance.

2. The method of claim 1, further comprising:
   updating the master page to include at least one of audio, video and images from the data presentation.

3. The method of claim 2, further comprising:
   identifying at least one content instance in the data presentation matching one of a plurality of content triggers associated with at least one user device registered with the proxy server; and notifying the at least one registered user device of the identified at least one content instance via a notification.

4. The method of claim 3, wherein the notification comprises a request to join the session.

5. The method of claim 1, further comprising:
automatically loading and adjusting a size of a window on a display of the at least one user device responsive to the notification being received by the at least one user device, the window comprising the at least one content instance and the size of the window being based on the priority assigned to the content trigger.

6. An apparatus comprising:
a receiver configured to receive a request from a first user device to connect to a session comprising a live web page collaboration application; and
a processor configured to
identify a first user profile associated with the first user device and a list of corresponding functions assigned to the first user device via the first user profile;
load a data presentation via a master page of a master application,
receive at least one co-browsing request from at least one other user device;
authorize the at least one co-browsing request;
provide live data from the data presentation to the first user device and the at least one other user device actively participating in the session, wherein the first user device is able to revert back to a live version of a previous session wherein each user device can have multiple master pages, each master page capable of communicating with each other;
identify a plurality of content triggers associated with at least one user device wherein upon the matching of the triggers the co-browsing session for the at least one user device is automatically created; and
identify a priority associated with each of the content triggers, wherein a notification is created based on the priority assigned to the content trigger that matches the at least one content instance.

7. The apparatus of claim 6, wherein the processor is further configured to update the master page to include at least one of audio, video and images from the data presentation.

8. The apparatus of claim 7, wherein the processor is further configured to:
identify at least one content instance in the data presentation matching one of a plurality of content triggers associated with at least one user device that is registered; and
notify the at least one registered user device of the identified at least one content instance via a notification.

9. The apparatus of claim 8, wherein the notification comprises a request to join the session.

10. The apparatus of claim 6, wherein the processor is further configured to automatically load and adjust a size of a window on a display of the at least one user device responsive to the notification being received by the at least one user device, the window comprising the at least one content instance and the size of the window being based on the priority assigned to the content trigger.

11. A non-transitory computer readable storage medium configured to store instructions that when executed causes a processor to perform:
receiving a request from a first user device to connect to a session comprising a live web page collaboration application managed by a proxy server;
identifying a first user profile associated with the first user device and a list of corresponding functions assigned to the first user device via the first user profile;
loading a data presentation via a master page of a master application operated by the proxy server;
receiving at least one co-browsing request from at least one other user device wherein each user device can have multiple master pages, each master page capable of communicating with each other;
authorizing the at least one co-browsing request; and
providing live data from the data presentation to the first user device and the at least one other user device actively participating in the session, wherein the first user device is able to revert back to a live version of a previous session;
identifying a plurality of content triggers associated with at least one user device wherein upon the matching of the triggers the co-browsing session for the at least one user device is automatically created; and
identifying a priority associated with each of the content triggers.

12. The non-transitory computer readable storage medium of claim 11, wherein the processor is further configured to perform:
updating the master page to include at least one of audio, video and images from the data presentation.

13. The non-transitory computer readable storage medium of claim 12, wherein the processor is further configured to perform:
identifying at least one content instance in the data presentation matching one of a plurality of content triggers associated with at least one user device registered with the proxy server; and
notifying the at least one registered user device of the identified at least one content instance via a notification.

14. The non-transitory computer readable storage medium of claim 13, wherein the notification comprises a request to join the session.

15. The non-transitory computer readable storage medium of claim 11 wherein the processor is further configured to perform:
automatically loading and adjusting a size of a window on a display of the at least one user device responsive to the notification being received by the at least one user device, the window comprising the at least one content instance and the size of the window being based on the priority assigned to the content trigger, and wherein the notification is created based on the priority assigned to the content trigger matching the at least one content instance.

* * * * *